(12) United States Patent
Krishnan et al.

(10) Patent No.: US 6,366,559 B1
(45) Date of Patent: Apr. 2, 2002

(54) METHOD AND SYSTEM FOR STATE-DEPENDENT ADMISSION CONTROL AND ROUTING OF MULTI-RATE CIRCUIT-SWITCHED TRAFFIC

(75) Inventors: Komandur R. Krishnan, Bridgewater; Frank Huebner-Szabo de Bucs, Eatontown, both of NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/092,732

(22) Filed: Jun. 5, 1998

Related U.S. Application Data

(60) Provisional application No. 60/048,841, filed on Jun. 6, 1997.

(51) Int. Cl.[7] .............................................. H04L 12/26

(52) U.S. Cl. ...................................... 370/230; 370/238

(58) Field of Search ................................ 370/230, 254, 370/238, 351, 400, 392, 389; 709/238, 239, 241, 244

(56) References Cited

U.S. PATENT DOCUMENTS

| | | | |
|---|---|---|---|
| 4,704,724 A | | 11/1987 | Krishnan et al. ............ 379/221 |
| 4,788,721 A | | 11/1988 | Krishnan et al. ............ 379/221 |
| 5,317,566 A | * | 5/1994 | Joshi ........................... 370/238 |
| 5,878,026 A | * | 3/1999 | Greenberg et al. ........... 370/230 |
| 5,940,372 A | * | 8/1999 | Bertin et al. ................. 370/238 |
| 5,970,050 A | * | 10/1999 | Johnson ....................... 370/238 |
| 6,034,946 A | * | 3/2000 | Roginsky et al. ............ 370/238 |

OTHER PUBLICATIONS

A. Kolarov and J. Hui, "On Computing Markov Decision Theory–Based Cost For Routing In Circuit–Switched Broadband Networks," Journal of Network and Systems Management, 3 (1995), pp. 405–426.

R–H Hwang, J. F. Kurose, and D. Towsley, "State–Dependent Routing For Multi–Rate Loss Networks," IEEE Globecom 1992, Orlando (1992), pp. 565–570.

"The Bell System Technical Journal," vol. 56, No. 7, Sep. 1977, pp. 1015–1336.

"The Bell System Technical Journal," vol. 57, No. 2, Feb. 1978, pp. 221–447.

J. S. Kaufman, "Blocking In A Shared Resource Environment," IEEE Transactions on Communications, 29 (1981), pp. 1474–1481.

\* cited by examiner

Primary Examiner—Melvin Marcelo
Assistant Examiner—D. Trinh
(74) Attorney, Agent, or Firm—Joseph Giordano; James W. Falk

(57) ABSTRACT

A method and system for routing multi-rate traffic in a communications network determines a first expected admission cost difference that corresponds to admission of the traffic onto a single-link route. If the first expected admission cost difference is less than a pre-determined cost threshold, the network routes the traffic through the single-link route. If the first expected admission cost difference is equal to or greater than the cost threshold, the network determines a second set of expected admission cost differences that corresponds to admission of the traffic onto a set of multi-link routes, and selects the multi-link route that has a minimum expected admission cost difference. If the minimum expected admission cost difference is less than the cost threshold, the network routes the traffic through the selected multi-link route. If the minimum expected admission cost difference is equal to or greater than the cost threshold, the network rejects the traffic so that a total traffic loss rate in the network is minimized.

5 Claims, 6 Drawing Sheets

METHOD AND SYSTEM FOR STATE-DEPENDENT ADMISSION CONTROL AND ROUTING OF MULTI-RATE CIRCUIT-SWITCHED TRAFFIC

CROSS-REFERENCE TO RELATED APPLICATIONS

This application claims the benefit of U.S. Provisional Application No. 60/048841, filed Jun. 6, 1997, the contents of which are hereby incorporated by reference.

BACKGROUND OF THE INVENTION

The present invention relates generally to traffic admission control and routing in communications networks, and more particularly, to systems and methods for controlling admission and routing of multi-rate, circuit-switched traffic in communications networks.

A communications network generally includes a plurality of nodes interconnected by transmission links (or "links"). Each link includes one or more trunks, which, in combination, define the total bandwidth (or "capacity") of the link. In a circuit-switched network, the network must set up a dedicated connection between a set of nodes in order to transport certain incoming traffic through the network. The selected set of nodes that make up a connection is generally referred to as a route.

When traffic arrives at the circuit-switched network, the network must determine whether to admit the traffic into the network, and if admitted, must determine how to route the traffic through the network given the current state of the links in the network. The state of a link may be represented by the available bandwidth in the link, for example, the number of free trunks in the link. A routing scheme that is based on the current state of each link in the network is referred to as a state-dependent routing scheme.

In a circuit-switched network, single-rate traffic includes calls that have identical bandwidth requirements and mean durations. Single-rate traffic may include one or more calls that carry only a single class of traffic, for example, voice. Multi-rate traffic, however, includes one or more calls that have different bandwidth requirements and durations and are multiplexed together onto a single link. For example, multi-rate traffic may include calls that carry multiple classes of traffic, for example, voice, video, and data, which are multiplexed together.

When a communications network multiplexes different classes of traffic onto a link, the traffic loss rate of the link may increase depending upon the specific bandwidth requirements, grades of service, and holding times of the different classes of traffic that are multiplexed together, even though the multiplexing results in a higher throughput in the link. For example, when two traffic classes with different mean holding times are combined onto a single link, it is possible that the loss rate of the combined traffic stream may be higher than the loss rate of each individual traffic stream when each stream is served by its own dedicated link, assuming that the single link has a bandwidth equal to the sum of the capacities of the dedicated links. A similar effect occurs when the two classes of traffic have different bandwidth requirements and require different grades of service. Thus, the network must provide a mechanism for controlling and routing the multi-rate traffic through the network while minimizing the traffic loss rate in the network.

As a result, when a network multiplexes together traffic streams of dissimilar characteristics to generate multi-rate traffic, the loss rate of some traffic classes may increase as a result of the multiplexing, while at the same time the loss rate of other traffic classes may decrease. Thus, in order to achieve multiplexing efficiency in all cases, there is a need for a traffic control and routing method that does not increase the loss rate of the resulting multi-rate traffic in the network.

One solution is to impose a set of bandwidth reservation-levels on the different classes of traffic that are multiplexed together onto a link, restricting admission of certain classes of traffic even when there is sufficient bandwidth available at the time the traffic arrives. This restriction protects the service level (i.e., the traffic loss rate) of other classes of traffic. However, there is yet no satisfactory method or system for determining an optimum set of bandwidth reservation levels for the different traffic classes that would minimize the traffic loss rate in the network.

Several solutions exist for determining traffic admission and routing rules that would minimize the traffic loss rate in a circuit-switched communications network. U.S. Pat. No. 4,704,724, entitled "Routing of Network Traffic" and U.S. Pat. No. 4,788,721, entitled "Routing of Network Traffic," disclose state-dependent routing methods for single-rate traffic that take into consideration the number of future traffic rejections in the network. While these two methods may be sufficient for single-rate traffic, the application of these methods to multi-rate traffic, especially for large number of traffic classes, is computationally intractable.

A. Kolarov and J. Hui, "On Computing Markov Decision Theory-Based Cost For Routing In Circuit-Switched Broadband Networks," Journal of Network and Systems Management, 3 (1995), discloses a method for routing multi-rate traffic in a network by partitioning the bandwidth of each link in the network among different classes of traffic. This method, however, is also computationally intractable, especially when applied to a network with a large number of classes of traffic.

R-H. Hwang, J. F. Kurose, and D. Towsley, "State-Dependent Routing For Multi-Rate Loss Networks," IEEE Globecom 1992, Orlando (1992), discloses a method for routing multi-rate traffic in a network based on the total occupancies (i.e., allocated bandwidth) of links in the network. This method, however, is based on an approximation that treats multi-rate traffic as single-rate traffic.

Thus, it is desirable to have methods and systems for controlling and routing multi-rate traffic in a circuit-switched communications network that do not have the above-mentioned disadvantages.

DESCRIPTION OF THE INVENTION

The present invention comprises a method and system for controlling multi-rate traffic onto a link in a communications network by determining, with respect to a fixed occupancy in the link, a set of expected admission costs that corresponds to a set of occupancies in the link, respectively, and determining a difference between the expected admission cost that corresponds to the occupancy of the link resulting from admission of the multi-rate traffic onto the link and the expected admission cost corresponding to a current occupancy of the link. If the difference is less than a predetermined cost threshold, the network admits the multi-rate traffic onto the link. If the difference is equal to or greater than the cost threshold, the network rejects the multi-rate traffic such that the total traffic loss rate in the link is minimized.

Specifically, the occupancy of a link is defined by the total traffic that is in progress in the link or the number of busy trunks in the link. The expected admission cost of the think is defined by the expected additional number of future calls that the network will have to reject from the link as a result of admitting the current call onto the link.

The present invention further comprises a method and system for routing multi-rate traffic in a communications network by determining a first expected admission cost difference corresponding to admission of the traffic onto a single-link route. An expected admission cost difference is a difference between the expected admission cost that corresponds to the occupancy of the single-link route resulting from admission of the traffic onto the single-link route and the expected admission cost corresponding to a current occupancy of the single-link route. If the first expected admission cost difference is less than a pre-determined cost threshold, the network routes the traffic through the single-link route.

If the first expected admission cost difference is equal to or greater than the cost threshold, the network determines a second set of expected admission cost differences that corresponds to admission of the traffic onto a set of multi-link routes, and selects the multi-link route that has a minimum expected admission cost difference. If the minimum expected admission coat difference is less than the cost threshold, the network routes the traffic through the selected multi-link route. If the minimum expected admission cost difference is equal to or greater than the cost threshold, the network rejects the traffic so that a total traffic loss rate in the communications network is minimized.

The methods and systems of the present invention reduce the traffic loss rate in a communications network. Equally important, the methods and systems of the present invention are computationally simple, and can be easily implemented in a communications network.

The description of the invention and the following description for carrying out the best mode of the invention should not restrict the scope of the claimed invention, Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
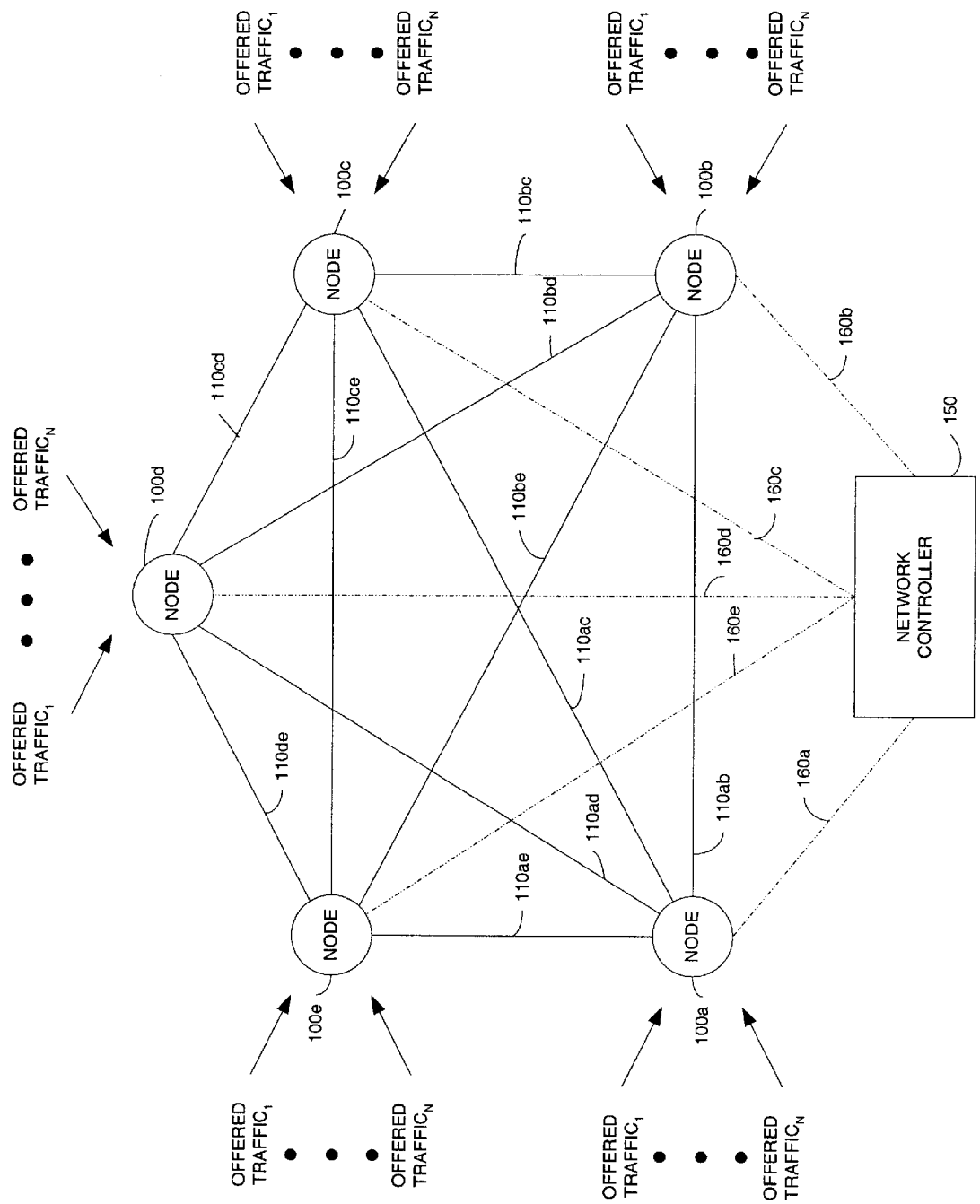
FIG. 1 illustrates a communications network in accordance with an embodiment of the invention.

FIG. 1 illustrates a communications network 170 in accordance with an embodiment of the invention. Network 170 comprises nodes 100a through 100e interconnected by links 110ab through 110ae, 110bc through 110be, 110cd, 110ce and 110de, a network controller 150, and signaling links 160a through 160e. Node 100a connects to nodes 100b through 100e via links 110ab through 110ae, respectively. Node 100b connects to nodes 100c through 100e via links 110bc through 110be, respectively. Node 100c connects to nodes 100d and 100e via links 110cd and 110ce, respectively, and node 100d connects to node 100e via link 110de. Each node 100a through 100e receives multi-rate traffic that includes traffic classes 1 through n, where n is an integer and the different traffic classes correspond to calls that have different bandwidth requirements and possibly different mean holding times (or durations).

Network controller 150 connects to nodes 100a through 100e via signaling links 160a through 160e. In a centralized network embodiment, network controller 150 controls and routes the multi-rate traffic arriving at nodes 100a through 100e. Network controller 150 communicates admission control and routing information with nodes 100a through 100e via signaling links 160a through 160e, respectively.

Figure 2:
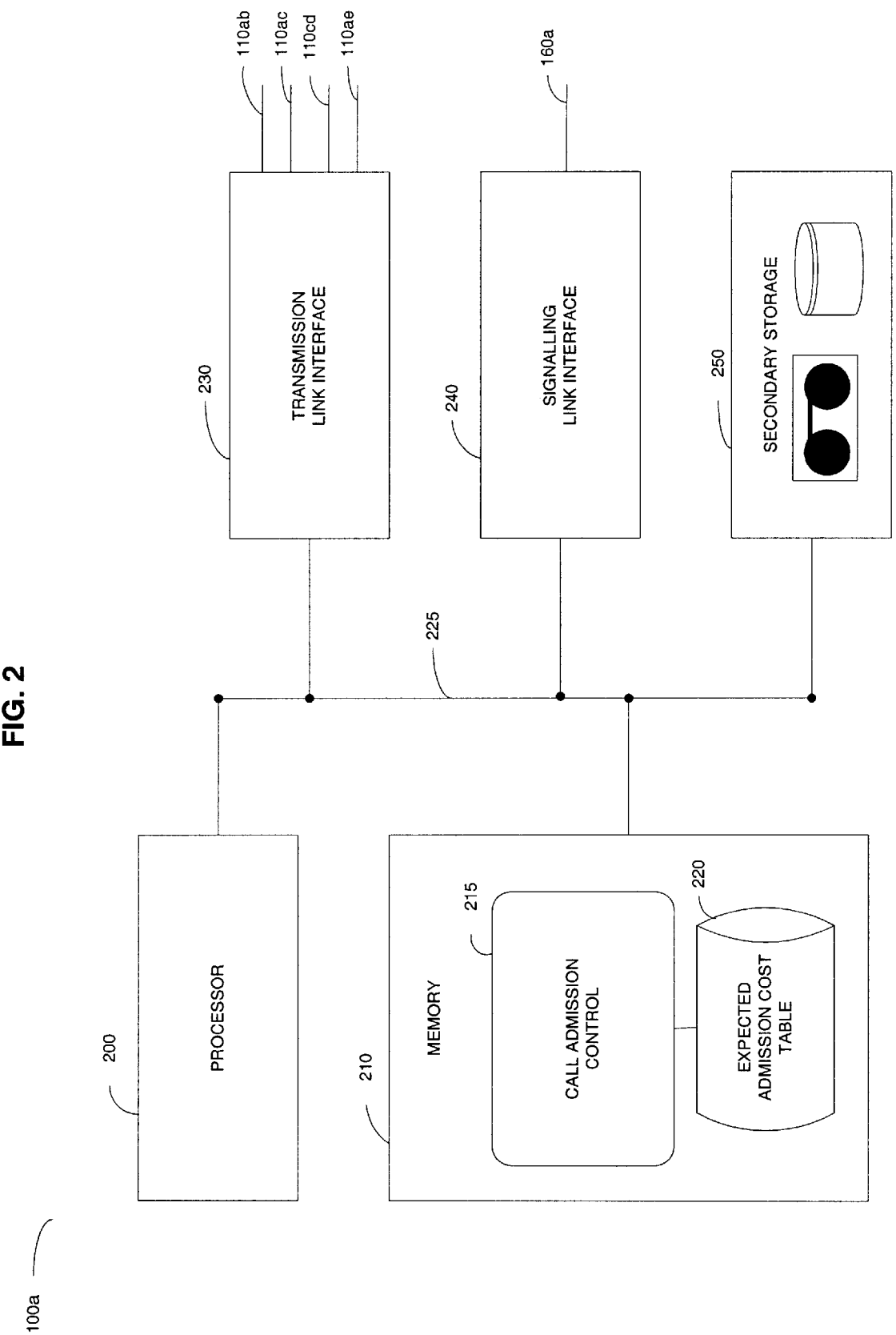
FIG. 2 is a block diagram of a node in a communications network in accordance with an embodiment of the invention.

FIG. 2 is a block of a node, for example 100a, in accordance with an embodiment of the invention. Node 100a comprises a processor 200 connected via bus 225 to a memory 210, a transmission link interface 230, a signaling link interface 240, and a secondary storage 250. Node 100a may also include various components of an electronic stored program controlled office (not shown) such as the No. 4 ESS disclosed in the publication of "The Bell System Technical Journal," Vol. 56, No.7, September 1977, pp. 1015–1336.

Memory 210 includes Call Admission Control 215 and Expected Admission Cost Table 220. Call Admission Control 215 includes instructions in the form of software, which processor 200 executes. Expected Admission Cost Table 220 includes a set of expected admission cost data, which Call Admission Control 215 determines at pre-determined intervals and stores therein. Moreover, at the pre-determined intervals, node 100a sends the determined expected admission costs to network controller 150.

Transmission link interface 230 provides an interface for transmitting and receiving traffic in the form of calls on links 110ab, 110ac, 110ad, and 110ae. Signaling link interface 240 interfaces link 160a.

Secondary storage 250 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Figure 3:
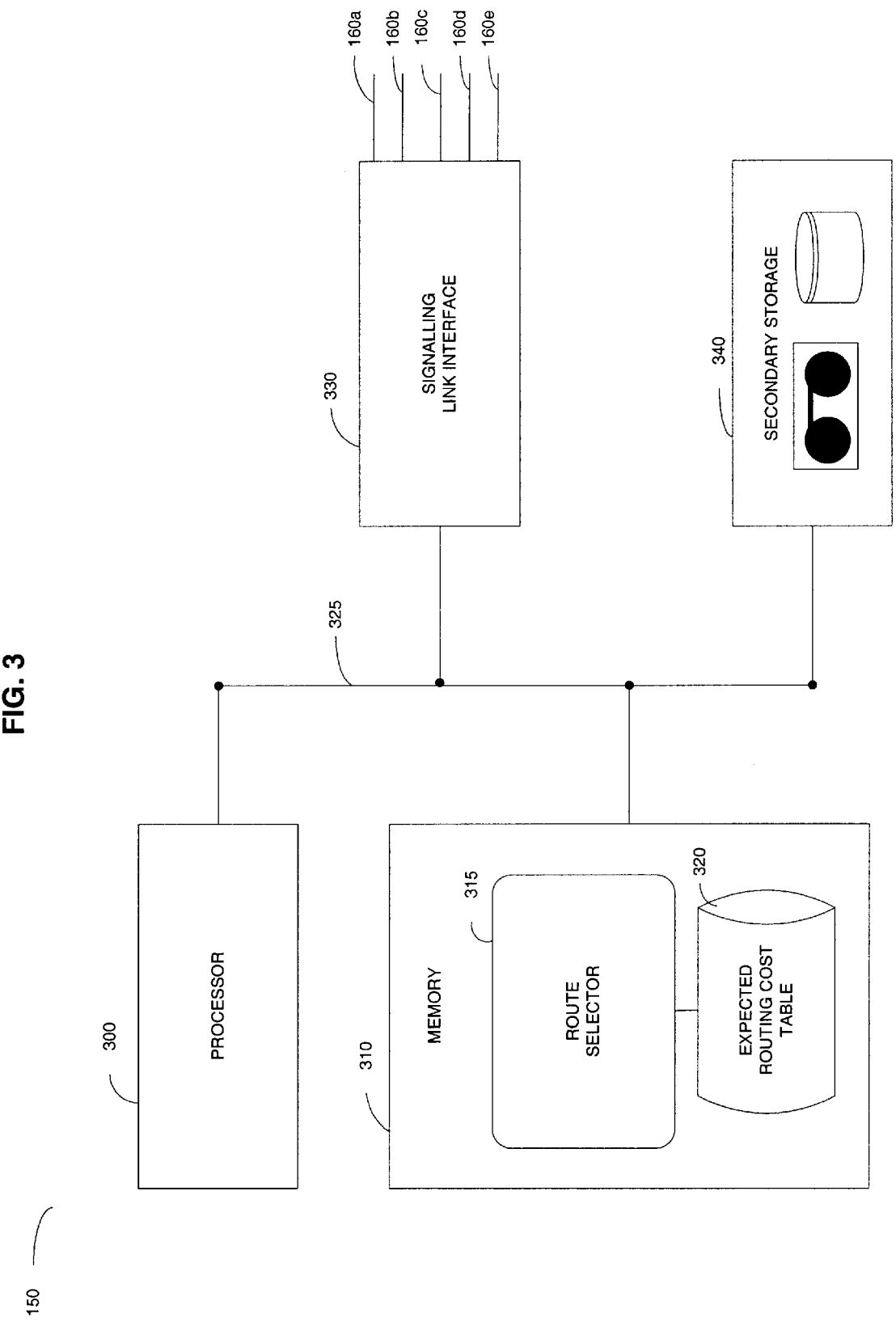
FIG. 3 is a block diagram of a network controller in a communications network in accordance with an embodiment of the invention.

FIG. 3 is a block diagram of network controller 150 in accordance with an embodiment of the invention. Network controller 150 comprises a processor 300 connected via bus 325 to a memory 310, a signaling link interface 330, and a secondary storage 340. Network Controller 150 may also include various components of a common channel interoffice signaling system (not shown) disclosed in the publication of "The Bell System Technical Journal," Vol. 57, No. 2, February 1978, pp 221–447.

Memory 310 includes Route Selector 315 and Expected Routing Cost Table 320. Route Selector 315 includes instructions in the form of software, which processor 300 executes. Expected Routing Cost Table 320 includes a set of expected admission cost data for each of links 110ab through 110ae, 110bc through 110be, 110cd, 110ce and 110de, representing a pooling of cost data available to nodes 100a through 100e.

Signaling link interface 330 provides an interface for transmitting and receiving signaling information via signaling links 160a through 160e.

Secondary storage 340 comprises a computer readable medium such as a disk drive and a tape drive. From the tape drive, software and data may be loaded onto the disk drive, which can then be copied into memory 310. Similarly, software and data in memory 310 may be copied onto the disk drive, which can then be loaded onto the tape drive.

Figure 4:
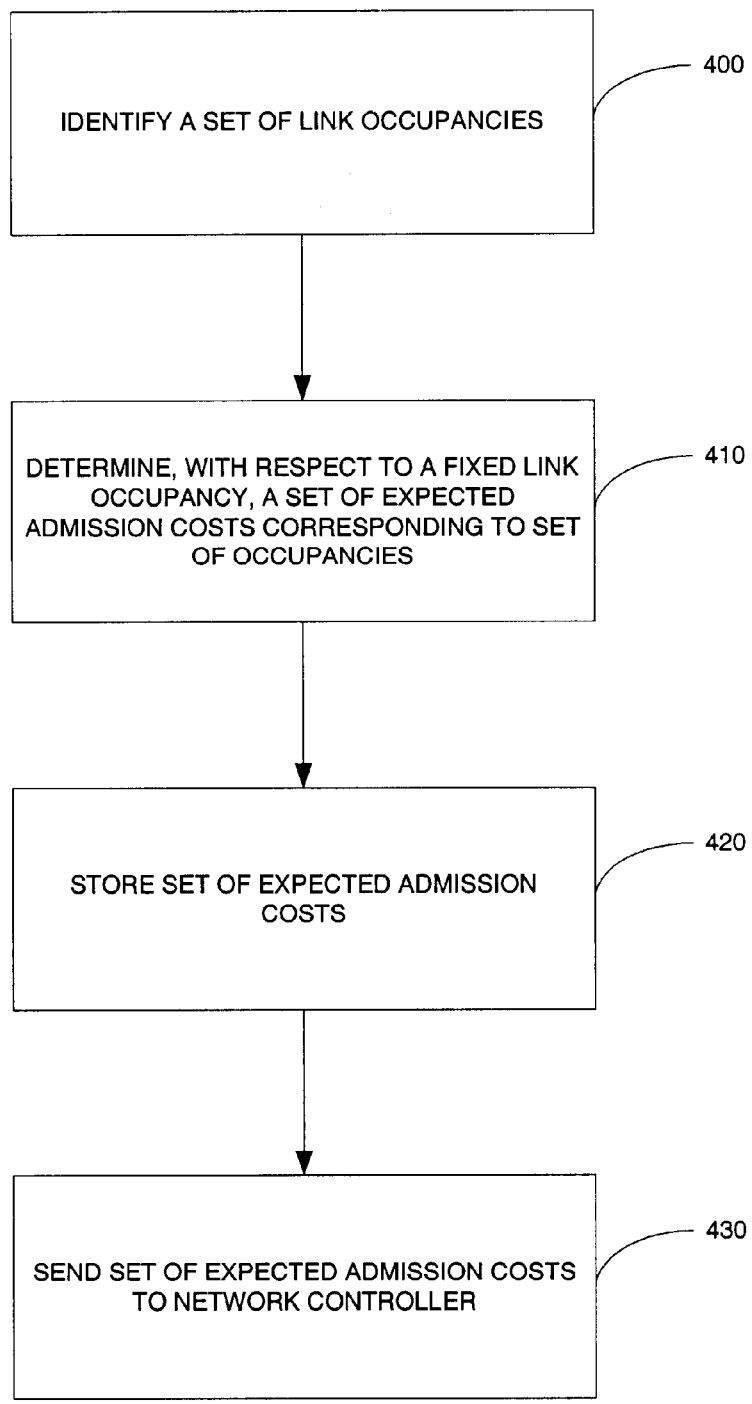
FIG. 4 is a flow chart of the steps that a node performs to determine a set of expected admission costs corresponding to a set of link occupancies in accordance with an embodiment of the invention.

FIG. 4 is a flow chart of the steps that Call Admission Control 215 in node 100a performs to determine a set of expected admission costs corresponding to a set of link occupancies, for each of links 110ab through 110ae incident at node 100a, in accordance with an embodiment of the invention. Call Admission Control 215 determines a set of occupancies in link 110ab (step 400). Call Admission Control 215 then determines, with respect to a fixed link occupancy, for example zero busy trunks, a set of expected admission costs corresponding to the identified set of link occupancies (step 410). Call Admission Control 215 stores the determined set of expected admission costs in Expected Admission Cost Table 220 (step 420). Finally, Call Admission Control 215 sends the determined set of expected admission costs to network controller 150 via signaling link 160a (step 430). Network controller 150 then stores the set of expected admission costs in Expected Routing Cost Table 320.

Figure 5:
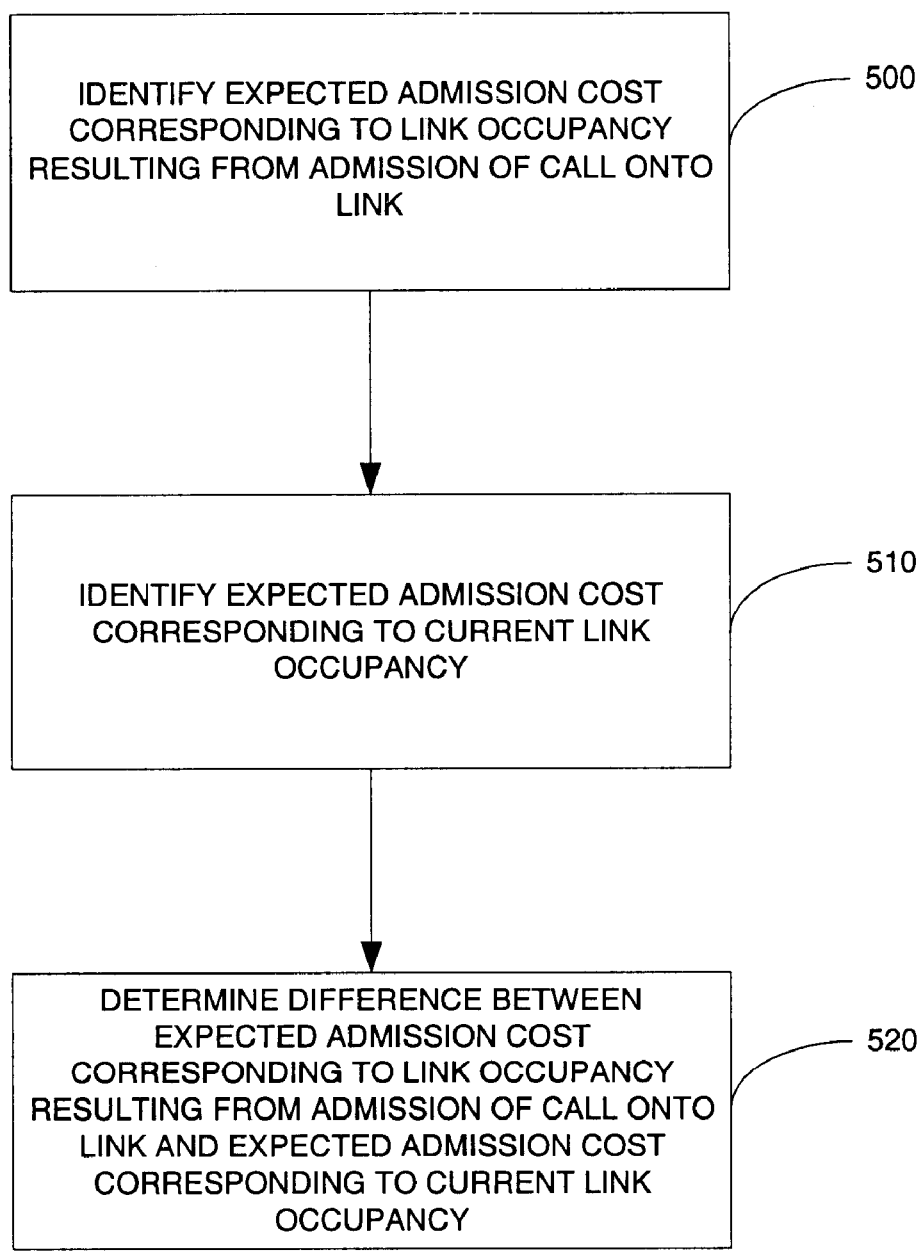
FIG. 5 is a flow chart of the steps that a network controller performs to determine an expected admission cost difference resulting from admission of a call onto a link in accordance with an embodiment of the invention.

FIG. 5 is a flow chart of the steps that Route Selector 315 in network controller 150 performs to determine an expected admission cost difference resulting from admission of a call onto a link, for example link 110ab, in accordance with an embodiment of the invention. When a call arrives at node 100a, Route Selector 315 retrieves from Expected Routing Cost Table 320 the expected admission cost corresponding to the link occupancy resulting from admission of the call onto link 110ab (step 500). Route Selector 315 then retrieves from Expected Routing Cost Table 320 the expected admission cost corresponding to the current occupancy of link 110ab (step 510). Route Selector 315 determines the difference between the expected admission cost corresponding to the link occupancy resulting from admission of the call onto link 100ab (as determined in step 500) and the expected admission cost corresponding to the current occupancy of link 110ab (as determined in step 510) (step 520).

Figure 6:
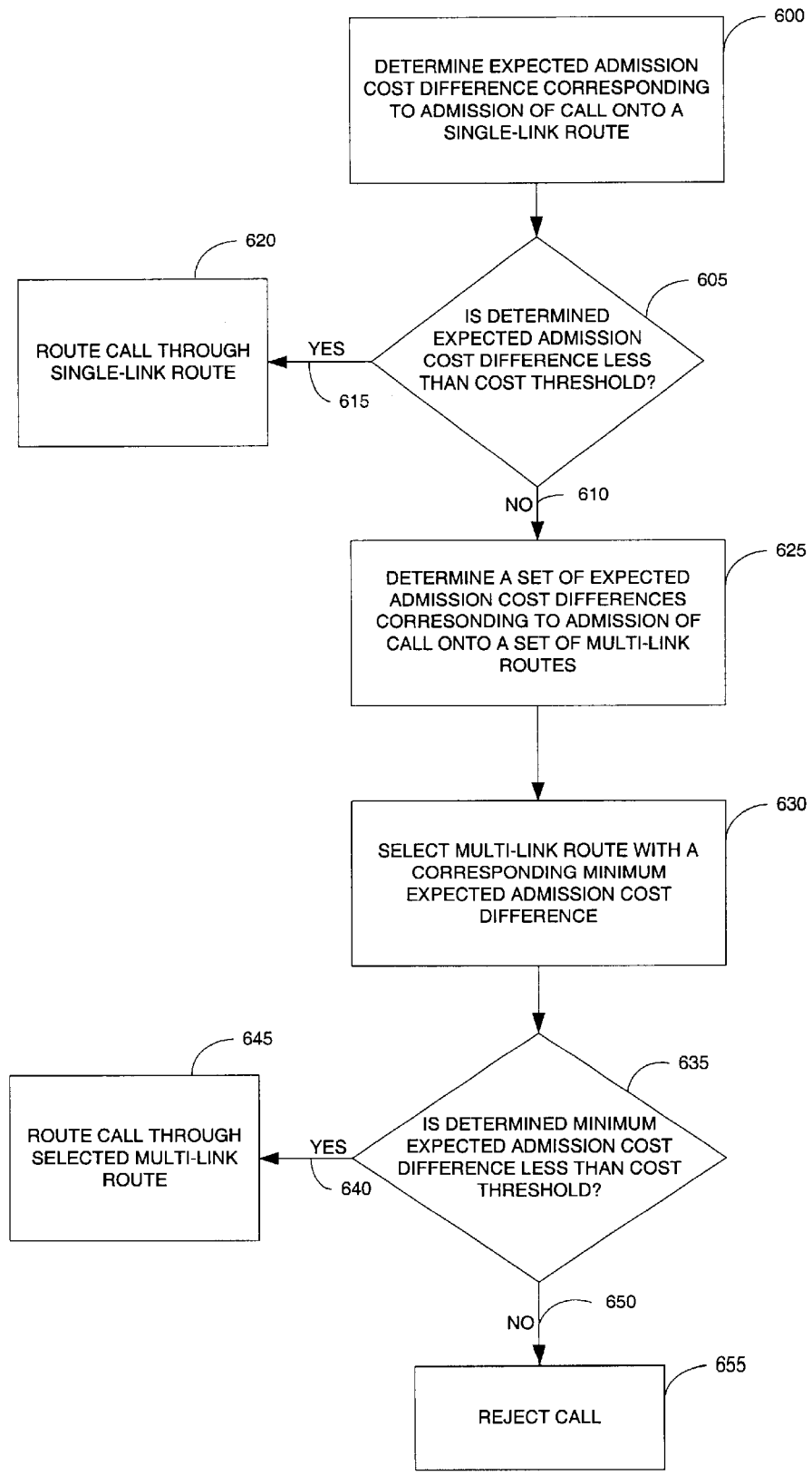
FIG. 6 is a flow chart of the steps that a network controller performs to route a call through a communications network in accordance with an embodiment of the invention.

FIG. 6 is a flow chart of the steps that Route Selector 315 in network controller 150 performs to route a call through network 170 in accordance with an embodiment of the invention. When a call arrives at a node, for example node 100a, and is destined for another node, for example node 100e, Route Selector 315 determines the expected admission cost difference corresponding to routing of the call via a single-link route, for example link 110ae, to node 100e (step 600). Specifically, as explained in FIG. 5, Route Selector 315 determines the difference between the expected admission cost corresponding to the occupancy in link 110ae resulting from admission of the call onto link 110ae and the expected admission cost corresponding to the current occupancy of link 110ae.

Route Selector 315 then determines whether the expected admission cost difference is less than a pre-determined cost threshold (step 605). If Route Selector 315 determines that the determined expected admission cost difference is less than the cost threshold (step 615), Route Selector 315 routes the call to node 100e via the single-link route consisting of link 110ae (step 620). Specifically, in an embodiment where each traffic class k does not have a corresponding weight (for example, priority), then the cost threshold for each class is one. In an embodiment where each traffic class k has a corresponding weight $\alpha_k$, the cost threshold for each traffic class k is $\alpha_k$.

If Route Selector 315 determines that the determined expected admission cost difference is greater than or equal to the cost threshold (step 610), Route Selector 315 determines a set of expected admission cost differences corresponding to admission of the call onto a get of multi-link routes (step 625). Specifically, the set of multi-link routes may include, for example, multi-link route via nodes 100b, 100c and 100d, multi-link route via nodes 100c and 100d, multi-link route via node 100c, and multi-link route via node 100d.

For each multi-link route, Route Selector 315 determines the expected admission cost difference corresponding to admission of the call on each link in the multi-link route. For example, for multi-link route via node 100b, node 100c, and node 100d, Route Selector 315 determines an expected admission cost difference for links 110ab, 110bc, 110cd, and 110de. Route Selector 315 then adds the determined expected admission cost difference of the links in the multi-link route. Similarly, Route Selector 315 determines an expected admission cost difference for the multi-link route via nodes 100c and 100d, multi-link route via node 100c, and multi-link route via node 100d.

Route Selector 315 then selects the multi-link route with the minimum expected admission cost difference (step 630). Route Selector 315 then determines whether the selected minimum expected admission cost difference is less than the cost threshold (step 635). If the selected minimum expected admission cost difference is less than the cost threshold (step 640), Route Selector 315 routes the call through the selected multi-link route by sending the selected multi-link route information to node 100a via signaling link 160a (step 645). If the selected minimum expected admission cost difference is not less than the cost threshold (step 650), Route selector 315 rejects the call by sending a call rejection message to node 100a via signaling link 160a (step 645).

In an alternative embodiment, when a call arrives at a node, for example node 100a, node 100a may first determine whether node 100a can route the call via a single-link route by performing the steps 600 through 620 shown in FIG. 6. If node 100a determines that the call cannot be routed via the single-link route, then node 100a sends a routing request message to network controller 150 to route the call via a multi-link route. Network controller 150 then performs the steps 625 through 655 shown in FIG. 6.

Specifically, when a call arrives at node 100a and is destined for another node, for example node 100e, Admission Control 215 determines the expected admission cost difference corresponding to routing of the call via a single-link route, for example link 110ae, to node 100e (step 600). As explained in FIG. 5, Admission Control 215 determines the difference between the expected admission cost corresponding to the occupancy of link 110ae resulting from admission of the call onto link 110ae and the expected admission cost corresponding to the current occupancy of link 110ae. Admission Control 215 then determines whether the expected admission cost difference is less than a pre-determined cost threshold (step 605). If Admission Control 215 determines that the determined expected admission cost difference is less than the cost threshold (step 615), Admission Control 215 routes the call to node 100e via the single-link route consisting of link 110ae (step 620).

EXPECTED ADMISSION COST

In accordance with an embodiment of the invention, Admission Control 215 determines a set of expected admission costs for links 110ab through 110ae, respectively, as follows: In general, there may be n classes of traffic in each of links 110ab through 110ae. On each link considered, each traffic class k may be described by the parameters $\lambda_k, \mu_k, r_k$, and $b_k$, where $\lambda_k$ is the Poisson arrival rate, $1/\lambda_k$ is the mean holding time, and $r_k$ is the required bandwidth (for example, the number of trunks required per call), and $b_k$ represents the probability that Admission Control 215 rejects traffic class k on the link under consideration. Using these parameters, the total traffic loss rate L of a link may generally be represented as follows:

$$L = \sum_{k=1}^{n} \lambda_k b_k \tag{1}$$

Similarly, where each traffic class in links 110ab through 110ae has a corresponding weight $\alpha_k$ (for example, representing the priority of the traffic class), a weighted total traffic loss rate L' of a link may generally be represented as follows:

$$L' = \sum_{k=1}^{n} \alpha_k \lambda_k b_k \tag{2}$$

Assuming that the holding time of each traffic class k has an exponential distribution, Admission Control 215 uses a Markov decision process with an average-reward criterion to determine whether to admit or reject offered traffic from links 110ab through 110ae. If C represents the total bandwidth of a link in integer units of trunks and m=(m1, ..., $m_n$) represent the link occupancy, where $m_k \geq 0$ is the number of class k calls that are in progress, then the occupancy space of the link consists of all vectors m such that:

$$\sum_{k=1}^{n} r_k m_k \leq C. \tag{3}$$

If M represents the size of the occupancy space of the link (i.e., the number of vectors m that satisfy equation (3)), then the set $\{a_{ij}, i,j=1, \ldots, M\}$ represents the occupancy transition rate matrix of a corresponding Markov chain. Accordingly, the set $\{y_i, i,j=1 \leq i \leq M\}$ represents the set of expected admission costs of occupancies in the link with respect to some fixed link occupancy, for example, the zero occupancy (i.e., $\{m_1=m_2=\ldots m_n=0\}$). Thus, the set $\{y_j\}$ and the traffic loss-rate L may be represented as follows:

$$L = x_i + \sum_{j=1}^{M} a_{ij} y_j \quad i = 1, \ldots, M, \tag{4}$$

where $x_i$ equals to traffic loss rate of a link with occupancy i, which traffic loss rate may be represented as the sum of arrival rates of those traffic classes that are rejected when link has occupancy i (for i=1, ..., M). Because the occupancy space M becomes very large even for moderate values of C and n, Admission Control 215 uses a set of aggregate occupancies to represent the state of the link, where each aggregate occupancy i corresponds to a set of exact occupancies {m} and may be represented as follows:

$$\sum_{k=1}^{n} r_k m_k = i. \tag{5}$$

The set of aggregate occupancies, however, may no longer be a Markov chain, since the actual path by which a link reaches a particular aggregate occupancy i may influence further evolution of the aggregate occupancy of the link from aggregate occupancy i. However, if there are many possible paths leading to an aggregate occupancy i, then Admission Control 215 may represent the transitions between the aggregate occupancies as a Markov chain. Thus, by using a set of aggregated occupancies, Admission Control 215 determines, for each link occupancy, the traffic classes that can be admitted to and rejected from the link. Admission Control 215 makes this determination based on the aggregate occupancy of the link, without regard to the precise mix of traffic classes that are in progress in the link. Hereinafter, an occupancy of a link means the aggregate occupancy of the link.

Specifically, using Kaufinan'sone-dimensional recursion disclosed in J. S. Kaufinan, "Blocking In A Shared Resource Environment," IEEE Transactions on Communications, 29 (1981)1474–1481, Admission Control 215 determines a set of link occupancy probabilities {q(i)}, which represents the probabilities of aggregate occupancies {i} of the link where {i=0, 1, ..., C}. Specifically, the probabilities {q(i)} may be represented as follows:

$$\lambda_k q(i-r_k) = \mu_k E(m_k|i) q(i), \; i=r_k, r_k+1, \ldots, C, \; k=1, \ldots, \tag{6}$$

where $E(m_k|i)$ is the conditional expected number of class k calls in progress given that i represents the aggregate occupancy of the link. The term $\mu_k E(m_k|i)$ represents the downward departure rate from occupancy i of the link.

Admission Control 215 then approximates the evolution of link occupancies as a Markov chain. Thus, from the set of link occupancy probabilities {q (i)}, Admission Control 215 generates a transition rate matrix, $\{\hat{a}_{ij}, i,j=0, \ldots, C\}$, for the set of aggregate link occupancies {i, i=0,1, ..., C}. The transition rate matrix represents the evolution of the aggregate occupancies of the link, and may be represented as follows:

$$(a) \quad \hat{a}_{i,i+r_k} = \lambda_k, \quad \text{for } i \leq C - r_k, \quad k = 1, \ldots, n \tag{7}$$

$$(b) \quad \hat{a}_{i,i-r_k} = \mu_k E(m_k | i) = \frac{\lambda_k q(i - r_k)}{q(i)}, \quad \text{for } i \geq r_k, \quad k = 1, \ldots, n$$

$$(c) \quad \hat{a}_{i,j} = 0, \quad \text{for all other } j (j \neq i)$$

$$(d) \quad \hat{a}_{ii} = -\sum_{\substack{u=0 \\ u \neq i}}^{C} \hat{a}_{iu}$$

Admission Control 215 then determines the set of link occupancy probabilities {q(i)} in equation (7) using Kaufuai's recursive method, which may be represented as follows:

$$q(i) = \frac{1}{i}\sum_{k=1}^{n} \frac{\lambda_k}{\mu_k} r_k q(i - r_k), \quad i = 1, 2, \ldots, C, \quad (8)$$

$$q(i) = \frac{\hat{q}(i)}{\sum_{i=0}^{C} \hat{q}(i)} \quad (9)$$

$$\sum_{i=0}^{C} q(i) = 1. \quad (10)$$

Assuming that the un-normalized probability of zero link occupancy, $\hat{q}(0)$, equals 1, Admission Control 215 determines the un-normalized probabilities of link occupancies 1 through C, ($\hat{q}(1), \ldots, \hat{q}(C)$), where $\hat{q}(x)$ is zero when x is a negative value. From the unnormalized probabilities, Admission Control 215 then determines the actual normalized link-occupancy probabilities, q(1) through q(C). Furthermore, for a given set of link bandwidth requirements {$r_k$}, certain link occupancies do not occur. For example, if the required bandwidth for a traffic class k is greater than, for example, one trunk, (i.e., $r_k > 1$), then the link occupancy of one busy trunk cannot occur. Thus, if the probability q(i) of a link occupancy i, equals zero, then Admission Control 215 excludes that link occupancy probability from the Markov chain because that occupancy cannot occur in the link.

UNWEIGHTED TRAFFIC CLASSES

In an embodiment where each traffic class k in a link does not have a corresponding weight, Admission Control 215 determines the set of expected admission costs {$z_i$} with respect to some fixed link occupancy, for example the zero occupancy, and the total traffic loss rate, L, as follows:

$$L = \omega_i + \sum_{j=0}^{C} \hat{a}_{ij} z_j, \quad i = 0, \ldots, C, \quad (11)$$

where $\omega_i \equiv$ the loss-rate in link occupancy i = sum of arrival rates of those traffic streams that are rejected in link occupancy i. Since the expected admission cost of zero occupancy, $z_0$, (i.e., zero busy trunks) in a link is zero, using equations (7) through (10), Admission Control 215 solves equation (11) to determine the set of expected admission costs, {$z_1, \ldots, z_C$}, and stores each expected admission cost in Expected Admission Cost Table 220.

WEIGHTED TRAFFIC CLASSES

In an embodiment where each traffic class k in a link has a corresponding weight $\alpha_k$, Admission Control 215 determines the set of expected admission costs {$\Phi_i$} with respect to some fixed link occupancy, for example the zero occupancy, and the total traffic loss rate, L', as follow:

$$L' = \omega_i + \sum_{j=0}^{C} \hat{a}_{ij} \phi_j, \quad i = 0, \ldots, C, \quad (12)$$

where $\omega_i \equiv$ weighted loss-rate in link occupancy i=$\Sigma \alpha_k \lambda_k k_k$, with the sum taken over those traffic classes k that are rejected when the link has occupancy i. Since the expected admission cost of zero occupancy, $\Phi_0$, in the link is zero, using equations (7) through (10), Admission Control 215 solves equation (12) to determine a set of expected admission costs {$\Phi_1, \ldots, \Phi_c$}, and stores each of the expected admission costs in Expected Admission Cost Table 220.

Referring back to FIG. 1, in an embodiment where each traffic class does not have a corresponding weight, links 110ab through 110ae, 110bc through 110be, 110cd and 110de may each have 150 trunks. The multi-rate traffic arriving at each node 100a through 100e may include 3 classes of traffic (i.e., k equals 3). Class 1 traffic may have, for example, a Poisson arrival rate, $\lambda_1$, of 20 call-arrivals/second, mean service rate, $\lambda_1$, of 1 call-departure/second, and a bandwidth, $r_1$, of 1 trunk/call. Class 2 traffic may have, for example, an arrival rate, $\lambda_2$, of 20 call-arrivals/second, mean service rate, $\lambda_2$, of 0.5 call-departures/second, and a bandwidth, $r_2$, of 2 trunks/call. Class 3 traffic may have, for example, an arrival rate, $\lambda_3$, of 5 call-arrivals/second, mean service rate, $\lambda_3$, of 0.3 call-departures/second, and a bandwidth, $r_3$, of 3 trunks/call.

Using equation (10), Admission Control 215 determines the following unnormalized occupancy probabilities of a link, for example, link 110ab:

$$\hat{q}(0) = 0.100 \times 10^1, \ \hat{q}(1) = 0.200 \times 10^2, \ \hat{q}(2) = 0.240 \times 10^3, \ \hat{q}(3) = 0.215 \times 10^4,$$

$$\hat{q}(4) = 0.158 \times 10^5, \ \hat{q}(5) = 0.996 \times 10^5, \ \hat{q}(6) = 0.558 \times 10^6, \ \hat{q}(7) = 0.283 \times 10^7,$$

$$\hat{q}(8) = 0.132 \times 10^8, \ \hat{q}(9) = 0.574 \times 10^8, \ \hat{q}(10) = 0.233 \times 10^9, \ \hat{q}(11) = 0.896 \times 10^9,$$

$$\hat{q}(12) = 0.326 \times 10^{10}, \ \hat{q}(13) = 0.113 \times 10^{11}, \ \hat{q}(14) = 0.377 \times 10^{11}, \ \hat{q}(15) = 0.121 \times 10^{12},$$

$$\vdots$$

$$\hat{q}(143) = 0.839 \times 10^{31}, \ \hat{q}(144) = 0.840 \times 10^{31}, \ \hat{q}(145) = 0.838 \times 10^{31}, \ \hat{q}(146) = 0.834 \times 10^{31},$$

$$\hat{q}(147) = 0.827 \times 10^{31}, \ \hat{q}(148) = 0.817 \times 10^{31}, \ \hat{q}(149) = 0.805 \times 10^{31}, \ \hat{q}(150) = 0.791 \times 10^{31}.$$

From the un-normalized link occupancy probabilities, using equations (8) and (9), Admission Control 215 determines the following normalized occupancy probabilities of link 110ab:

$$q(0) = 0.426 \times 10^{-32}, \ q(1) = 0.851 \times 10^{-31}, \ q(2) = 0.102 \times 10^{-29}, \ q(3) = 0.915 \times 10^{-29},$$

-continued $$q(4) = 0.671 \times 10^{-28}, q(5) = 0.424 \times 10^{-27}, q(6) = 0.238 \times 10^{-26}, q(7) = 0.121 \times 10^{-25},$$

$$q(8) = 0.563 \times 10^{-25}, q(9) = 0.244 \times 10^{-24}, q(10) = 0.994 \times 10^{-24}, q(11) = 0.381 \times 10^{-23},$$

$$q(12) = 0.139 \times 10^{-22}, q(13) = 0.483 \times 10^{-22}, q(14) = 0.161 \times 10^{-21}, q(15) = 0.513 \times 10^{-21},$$

$$\vdots$$

$$q(143) = 0.357 \times 10^{-1}, q(144) = 0.358 \times 10^{-1}, q(145) = 0.357 \times 10^{-1}, q(146) = 0.355 \times 10^{-1},$$

$$q(147) = 0.352 \times 10^{-1}, q(148) = 0.348 \times 10^{-1}, q(149) = 0.343 \times 10^{-1}, q(150) = 0.337 \times 10^{-1}.$$

From equation (11), Admission Control 215 then determines the following set of expected admission costs corresponding to a set of occupancies in link 110ab:

$$z_0 = 0.000, z_1 = 0.034, z_2 = 0.068, z_3 = 0.103, z_4 = 0.138, z_5 = 0.173,$$

$$z_6 = 0.209, z_7 = 0.245, z_8 = 0.281, z_9 = 0.318, z_{10} = 0.355, z_{11} = 0.392,$$

$$z_{12} = 0.430, z_{13} = 0.468, z_{14} = 0.507, z_{15} = 0.546, z_{16} = 0.585, z_{17} = 0.624,$$

$$z_{18} = 0.664, z_{19} = 0.704, z_{20} = 0.745, z_{21} = 0.786, z_{22} = 0.827, z_{23} = 0.869,$$

$$\vdots$$

$$z_{139} = 13.023, z_{140} = 13.339, z_{141} = 13.667, z_{142} = 14.009, z_{143} = 14.366, z_{144} = 14.738,$$

$$z_{145} = 15.127, z_{146} = 15.532, z_{147} = 15.960, z_{148} = 16.399, z_{149} = 16.859, z_{150} = 17.470.$$

Based on the above set of expected admission costs, Route Selector 315 admits class 1 traffic onto link 110ab when link 110ab has 0 through 149 occupancies (or busy trunks); admits class 2 traffic onto link 110ab when link 110ab has 0 through 147 occupancies; and admits class 3 traffic onto link 110ab when link 110ab has 0 through 139 occupancies. In other words, Route Selector 315 rejects class 1 traffic from link 110ab when link 110ab has 150 occupancies; rejects traffic class 2 from link 110ab when link 110ab has 148 through 150 occupancies; and rejects class 3 traffic from link 110ab when link 110ab has 140 through 150 occupancies.

In another embodiment, class 1, 2, and 3 traffic may have weights $\alpha_1, \alpha_2, \text{ and } \alpha_3$ equal to 1, 2, and 2, respectively. From equation (12), Admission Control 215 determines the following set of expected admission costs corresponding to a set of possible occupancies in link 110ab:

$$\phi_0 = 0.000, \phi_1 = 0.059, \phi_2 = 0.118, \phi_3 = 0.178, \phi_4 = 0.239, \phi_5 = 0.300,$$

$$\phi_{18} = 1.153, \phi_{19} = 1.222, \phi_{20} = 1.293, \phi_{21} = 1.364, \phi_{22} = 1.436, \phi_{23} = 1.508,$$

$$\phi_6 = 0.362, \phi_7 = 0.425, \phi_8 = 0.488, \phi_9 = 0.552, \phi_{10} = 0.616, \phi_{11} = 0.681,$$

$$\phi_{12} = 0.746, \phi_{13} = 0.813, \phi_{14} = 0.879, \phi_{15} = 0.947, \phi_{16} = 1.015, \phi_{17} = 1.083,$$

$$\vdots$$

$$\phi_{139} = 22.602, \phi_{140} = 23.150, \phi_{141} = 23.720, \phi_{142} = 24.313, \phi_{143} = 24.932, \phi_{144} = 25.578,$$

$$\phi_{145} = 26.252, \phi_{146} = 26.955, \phi_{147} = 27.699, \phi_{148} = 28.450, \phi_{149} = 29.308, \phi_{150} = 30.161.$$

Based on the above set of expected admission costs, Route Selector 315 admits class 1 traffic onto link 110ab when link 110ab has 0 through 149 occupancies; admits class 2 traffic onto link 110ab when link 110ab has 0 through 148 occupancies, and admits class 3 traffic onto link 110ab when link 110ab has 0 through 142 occupancies. In other words, Route Selector 315 rejects class I traffic from link 110ab when link 110ab has 150 occupancies; rejects class 2 traffic from link 110ab when link 110ab has 149 or 150 occupancies; and rejects class 3 traffic from link 110ab when link 110ab has 143 through 150 occupancies.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

Wheat is claimed is:

1. A method for admission control of multi-rate circuit-switched traffic on a candidate link in a communications network comprising a network controller and a plurality of nodes interconnected by one or more links, said method comprising the steps of:

determining at one of the nodes, with respect to a fixed occupancy in the link incident at the one of the nodes, using Markov decision processing, a set of expected admission costs corresponding to a set of occupancies in the link, respectively;

communicating the set of expected admission costs to the network controller;

in response to receiving a call at the one of the nodes, determining in the network controller a difference between the expected admission cost corresponding to the occupancy in the link resulting from admission of the multi-rate traffic onto the link and the expected admission cost corresponding to a current occupancy of the link;

admitting the multi-rate circuit-switched traffic onto the link when the difference is less than a cost threshold; and rejecting the multi-rate circuit-switched traffic when the difference is equal to or greater than the cost threshold, such that a total traffic loss rate in the link is minimized.

2. A method for admission control and routing multi-rate circuit-switched traffic in a communications network comprising a network controller and nodes interconnected via links, said method comprising the steps of:

determining at one of the nodes, with respect to a fixed occupancy in a single-link route incident at the one of the nodes, using Markov decision processing, a set of expected admission costs corresponding to a set of occupancies in the single-link route, respectively;

communicating the set of expected admission costs to the network controller;

determining in the network controller a difference between the expected admission cost corresponding to the occupancy in the single-link route resulting from admission of the multi-rate traffic onto the single-link route and the expected admission cost corresponding to a current occupancy of the single-link route;

routing the multi-rate circuit-switched traffic through the single-link route when the first expected admission cost differences is less than a cost threshold;

determining at the network controller the expected admission cost differences corresponding to admission of the multi-rate traffic onto each link in each of the multi-link routes;

adding, for each of the multi-link routes, the determined expected admission cost differences for the links in each of the multi-link routes;

determining a further set of expected admission cost differences corresponding to admission of the multi-rate circuit-switched traffic onto a set of multi-link routes in the communications network when the first expected admission cost difference is equal to or greater than the cost threshold;

selecting the multi-link route having a corresponding minimum expected admission cost difference;

routing the multi-rate circuit-switched traffic through the selected multi-link route when the minimum expected admission cost difference is less than the cost threshold; and rejecting the multi-rate circuit-switched traffic when the minimum expected admission cost difference is equal to or greater than the cost threshold such that a total traffic loss rate in the communications network is minimized.

3. The method of claim 2, wherein said step of determining the further set of expected admission cost differences further comprises the steps of:

determining the expected admission cost differences corresponding to admission of the multi-rate traffic onto each link in each of the multi-link routes; and adding, for each of the multi-link routes, the determined expected admission cost differences for the links in each of the multi-ink routes.

4. A computer-readable medium containing codes for configuring a switching system to perform a method for admission control of multi-rate circuit-switched traffic on a link in a communications network, said method comprising the steps of:

determining, using a Markov decision process with respect to a fixed occupancy in the link, a set of expected admission costs corresponding to a set of occupancies in the link, respectively;

determining a difference between the expected admission cost corresponding to the occupancy in the link resulting from admission of the multi-rate traffic onto the link and the expected admission cost corresponding to a current occupancy of the link;

admitting the multi-rate circuit-switched traffic onto the link when the difference is less than a cost threshold; and rejecting the multi-rate circuit-switched traffic when the difference is equal to or greater than the cost threshold, such that a total traffic loss rate in the link is minimized.

5. A computer-readable medium containing codes for configuring a network controller to perform a method for admission control and routing of multi-rate circuit-switched traffic in a communications network comprising nodes, wherein the nodes are interconnected to each other via links, said method comprising the steps of:

determining, using a Markov decision process, a first expected admission cost difference corresponding to admission of the call onto a single-link route in the communications network;

routing the multi-rate circuit-switched traffic through the single-link route when the first expected admission cost difference is less than a cost threshold;

determining a second set of expected admission cost differences corresponding to admission of the multi-rate circuit-switched traffic onto a set of multi-link routes in the communications network when the first expected admission cost difference is equal to or greater than the cost threshold;

selecting the multi-link route having a corresponding minimum expected admission cost difference;

routing the multi-rate circuit-switched traffic through the selected multi-link routes when the minimum expected admission cost difference is less than the cost threshold; and rejecting the multi-rate circuit-switched traffic when the minimum expected admission cost difference is equal to or greater than the cost threshold, such that a total traffic loss rate in the communications network is minimized.

* * * * *